United States Patent
Anderson et al.

(10) Patent No.: US 7,164,264 B2
(45) Date of Patent: Jan. 16, 2007

(54) DYNAMIC SILICON CHARACTERIZATION OBSERVABILITY USING FUNCTIONAL CLOCKS FOR SYSTEM OR RUN-TIME PROCESS CHARACTERIZATION

(75) Inventors: Carl John Anderson, Austin, TX (US); Michael Stephen Floyd, Austin, TX (US); Brian Chan Monwai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 11/055,045

(22) Filed: Feb. 10, 2005

(65) Prior Publication Data

US 2006/0176049 A1    Aug. 10, 2006

(51) Int. Cl.
*G01R 31/26* (2006.01)

(52) U.S. Cl. .................. 324/158.1; 324/765; 324/73.1; 703/15

(58) Field of Classification Search .............. None
See application file for complete search history.

(56) References Cited

U.S. PATENT DOCUMENTS 5,535,370 A * 7/1996 Raman et al. ............... 703/15
5,568,493 A * 10/1996 Morris ...................... 714/726

OTHER PUBLICATIONS

U.S. Appl. No. 11/050,324, filed Feb. 3, 2005, Floyd et al.

* cited by examiner

*Primary Examiner*—Minh N. Tang
(74) *Attorney, Agent, or Firm*—Duke W. Yee; Mark E. McBurney; Cathrine K. Kinslow

(57) ABSTRACT

A method and system for dynamic characterization observability using functional clocks for system or run-time process characterization. Silicon characterization circuitry may be read after silicon chips have been assembled in a package and installed in a system. A characterization circuit comprising one or more oscillators generates signal pulses, wherein the signal pulses represent a frequency of a circuit in the processor chip. A sampler circuit is connected to the characterization circuit, wherein the sampler circuit counts the number of the signal pulses from the characterization circuit within a predetermined time period. A control unit is connected to the sampler circuit, wherein the control unit comprises macros for collecting count data from the one or more oscillators to determine the silicon characterization. Based on the silicon characterization, the optimal operating frequency of the processor chip may be identified, as well as possible lifetime degradation of circuits on the chip.

20 Claims, 4 Drawing Sheets

DYNAMIC SILICON CHARACTERIZATION OBSERVABILITY USING FUNCTIONAL CLOCKS FOR SYSTEM OR RUN-TIME PROCESS CHARACTERIZATION

CROSS REFERENCE TO RELATED APPLICATION

This application is related to commonly assigned and U.S. patent application Ser. No. 11/050,324 entitled "System and Method for Thermal Monitoring of IC Using Sampling Periods of Invariant Duration", filed Feb. 03, 2005, and incorporated herein by reference.

BACKGROUND OF THE INVENTION

1. Technical Field

The present invention relates to an improved data processing system, and in particular, the present invention is directed to a system and method for providing dynamic characterization observability using functional clocks for system or run-time process characterization.

2. Description of Related Art

In computer chip manufacturing, one important tool used by chip makers to gauge success is by measuring the certain important parameters of the result using silicon characterization. Silicon wafers are created by first growing cylinders of crystalline silicon from a melted silicon solution. These cylinders are sliced into thin disks, or wafers, and later polished. The polished wafers are then cut into small chips, which may be placed within a computer system.

With respect to characterization, chips may often be discarded because they do not meet the testing parameters needed to identify the chip as a good chip. Manufacturing tests are performed to see whether the manufactured chip meets the specifications for the particular type of processor. These tests typically attempt to obtain full test coverage of every device on the chip. For example, tests that may be performed include functional and structural tests. A functional test tests the chip function in normal operation while a structural test specifically focuses on manufacturing defects that might cause the chip to behave differently from normal operations. Some of the tests involve a burden or stress test. Such a process subjects a chip to high temperature and over voltage supply while running production tests.

Current state of the art silicon chip design and manufacturing places characterization circuits on the wafer, such as within the KERF. The KERF is the space between the chips cut from the silicon wafer. The KERF is used by chip makers to perform tests to determine how well the silicon chip was manufactured. Throwaway characterization circuits are typically placed on the KERF at wafer test so that process parameters, such as normal variation during fabrication, can be measured. For instance, oxide thicknesses, channel widths, wire resistance, etc., can be measured typically by observing the frequency of performance screen ring oscillators (PSRO), which are designed to be sensitive to different parameters of the process. Similarly, across-the-chip linewidth variation (ACLV), which is a normal process variation across the chip/wafer, can also be measured. Increasingly, these characterization circuits have also been embedded in the processor chip itself along with the normal functional circuits, instead of only being placed in the KERF, allowing more direct measurement of the chip.

However, in existing systems, observing these process characterization circuits requires the wafer to be connected to a multi-million dollar tester, or at the very minimum the outputs of these circuits somehow be made visible to external C4 pins so the outputs can escape the chip/module to be probed. This scenario is not practical once the chips are put into a real system because of the sheer number of chips and number of test pins that would need to be instrumented. In addition, the necessary signal quality needed to measure the frequency would be difficult to obtain in a complete system. As a result, characterization data is usually collected at wafer test and stored in a database. A drawback of observing characterization only at wafer test is that it is difficult to maintain this data out to the early bringup lab or even later to the field. Also, existing systems do not address situations where the characteristics of the chip change (for example degrade) after initial screening at the wafer (e.g., during burn-in or due to later life degradation mechanisms such as hot electron effects, negative bias temperature instability (NBTI), etc.).

Therefore, it would be advantageous to have a method and system for reading silicon characterization circuitry after the silicon chips have already been assembled in a package and installed in a system.

SUMMARY OF THE INVENTION

The present invention provides a method and system for dynamic characterization observability using functional clocks for system or run-time process characterization. With the mechanism of the present invention, silicon characterization circuitry may be read after the silicon chips have already been assembled in a package and installed in a system. A characterization circuit comprising one or more oscillators is provided for generating signal pulses, wherein the signal pulses represent a frequency of a circuit in the processor chip. A sampler circuit is connected to the characterization circuit, wherein the sampler circuit counts the number of the signal pulses from the characterization circuit within a predetermined time period. A control unit is connected to the sampler circuit, wherein the control unit comprises macros for collecting and deserializing count data from the one or more oscillators to determine the silicon characterization. Based on the silicon characterization, the optimal operating frequency of the processor chip may be identified as well as possible lifetime degradation of circuits on the chip.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
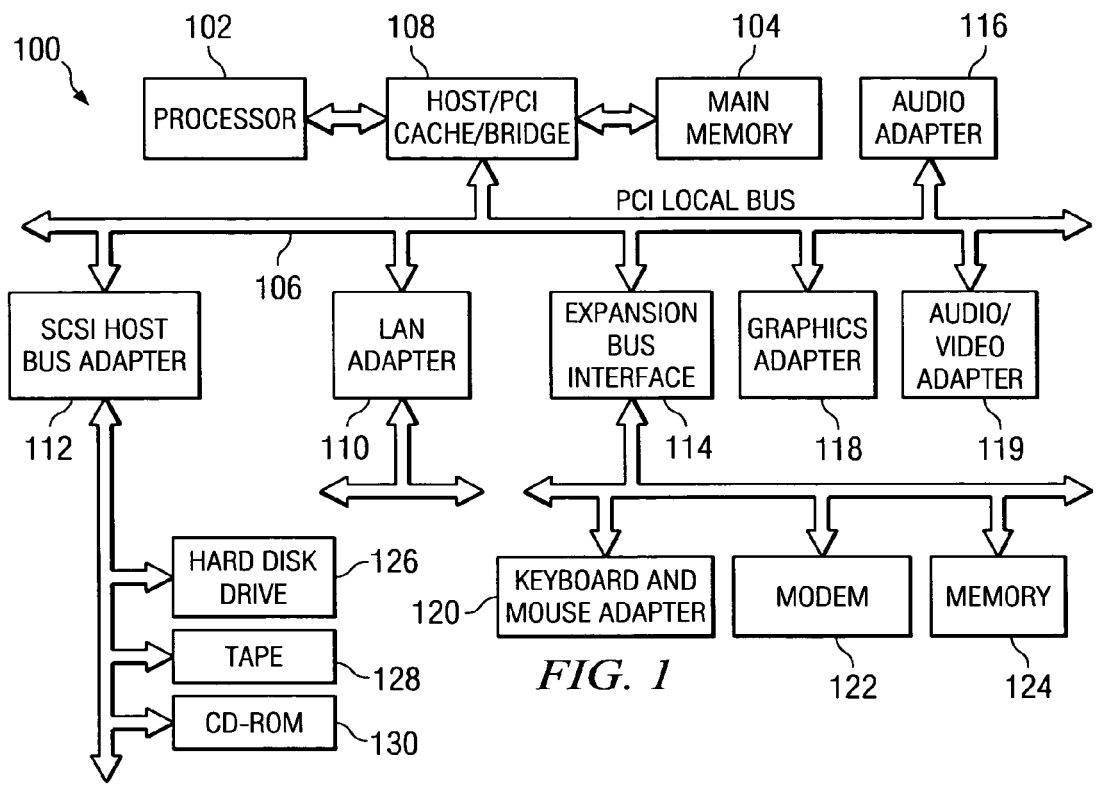
FIG. 1 is an exemplary pictorial representation of a data processing system in which the present invention may be implemented.

With reference now to FIG. 1, an exemplary block diagram of a data processing system is shown in which the present invention may be implemented. Data processing system 100 is an example of a computer, in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. Instructions for the operating system, applications, or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126–130.

The present invention provides a mechanism for reading the silicon characterization circuitry after the silicon chips have already been assembled in a package and installed in a system. With the mechanism of the present invention, silicon characteristics may be determined while the computer chip is running and the chips are plugged into a board. The present invention improves upon existing systems by removing reliance on maintaining a database of characterization information for a wafer from the initial wafer test, as well as removing the need to trust the data received from manufacturing (e.g., using part serial numbers to track characterization from wafer fabrication to early bringup). The present invention also allows for measurement of chip fabrication after stress has been applied to the part and the chip is installed in a functional system.

In a preferred embodiment of the present invention, a characterization circuitry, or MHCRO, is used in combination with functional clocks in a digital sampling circuitry to allow characterization of an integrated circuit to be observed during runtime in a functional system. With the mechanism of the present invention, no special clocks or pins are used to observe the characterization. A time invariant source as described in related U.S patent application "System and Method for Thermal Monitoring of IC Using Sampling Periods of Invariant Duration", which is incorporated above, may also be used to sample the MHCRO. The time invariant source may be an external clock source that is used to increment a counter which controls the duration of time in which the integrated circuit is sampled.

The MHCRO is a collection of process sensitive circuits comprised of performance screen ring oscillators (PSROs). MHCRO is used to generate signal pulses for measuring the speed of an integrated circuit and provides an output of the frequency of the circuit. The present mechanism of the present invention also provides digital sampling circuitry attached to the output of the characterization circuitry. The sampling component is coupled to the MHCRO to count the number of pulses generated by the oscillators during predetermined time sample periods. Functional clocks in the sampling circuitry are used to sample the characterization circuitry, so that no special test clocks or procedures are needed to read the installed chip's parameters. These functional clocks may also be used by system firmware to poll the characteristics of each chip in the system and then determine the optimal operating frequency and temperature for the system based on the characteristics.

Figure 2:
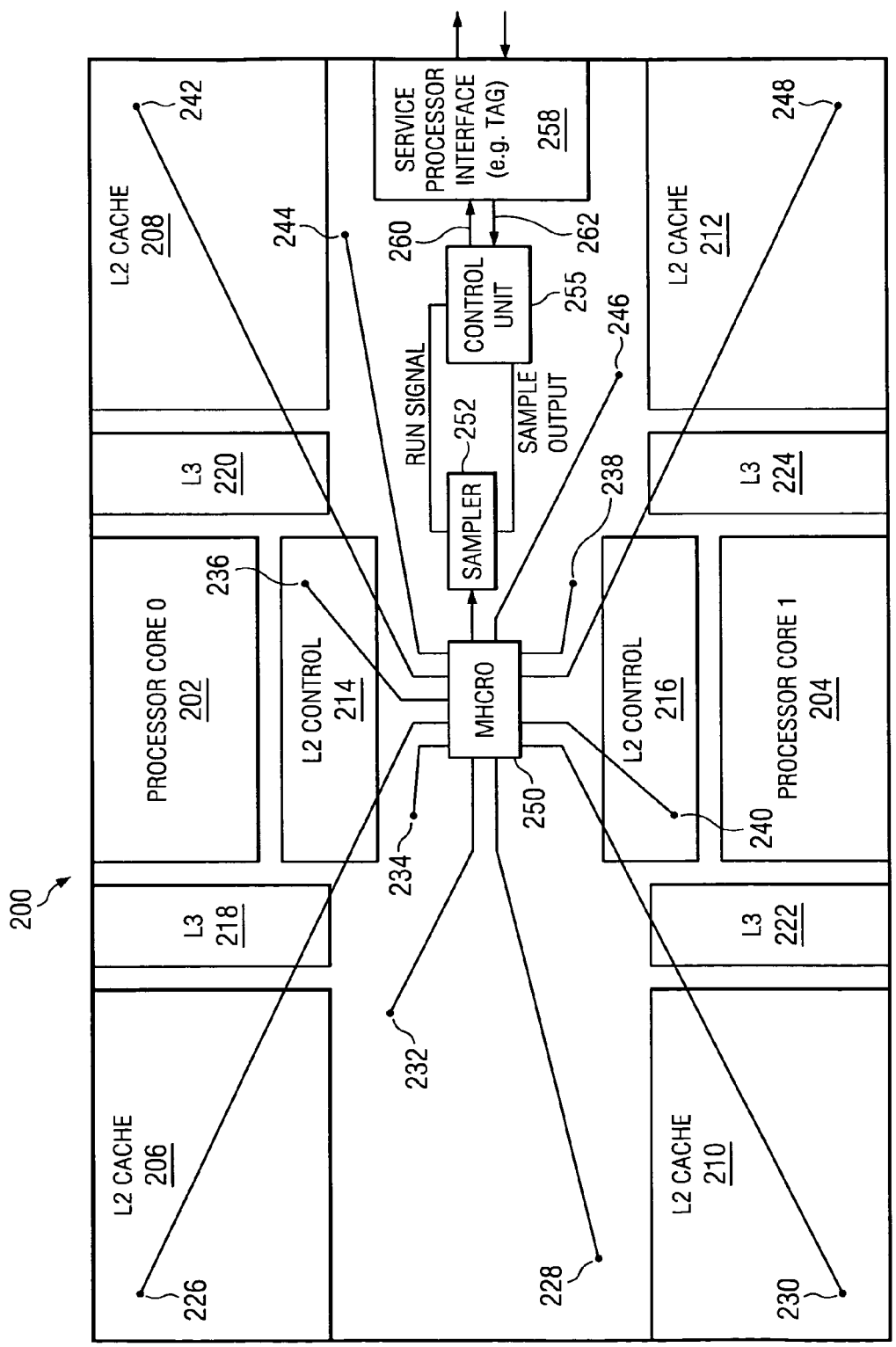
FIG. 2 is a block diagram of an exemplary processor chip in accordance with a preferred embodiment of the present invention.

Turning now to FIG. 2, a block diagram of an exemplary processor chip in accordance with a preferred embodiment of the present invention is shown. Processor 200 may be implemented as processor 102 in FIG. 1.

In this illustrative example, processor 200 comprises two processor cores, processor core0 204 and processor core1 206, L2 caches 206–212, L2 controls 214 and 216, and L3 directories 218–224. Multiple PSROs 226–248 are also included in processor 200. As shown, PSROs 226–248 form a rough grid over processor 200, and may be used to measure the ACLV or normal process variation across the chip.

Characterization circuitry MHCRO 250 also includes several PSRO circuits 304–306, each designed to test a different aspect of the silicon manufacturing process. A separate read circuitry generates signal pulses to the MHCRO sampling circuitry for measuring the performance of the chip process parameters. MHCRO 250 is hooked to digital sampling circuitry 252 and provides the sampling circuitry with an output of the frequency of the circuit. Digital sampling circuitry 252 is coupled to the MHCRO to count the number of pulses generated by the PSROs during predetermined time sample periods.

The control unit 255 comprises logic that includes circuits to generate and send run and sample signals to digital sampling circuit 252. The control logic also collects and deserializes the data obtained from PSROs 226–248. Digital sampling circuitry 252 may be read by a service processor via service processor interface 258 (e.g., SCOM request 260, SCOM response 262) with system clocks running. For example, the service processor may be allowed to read the count values in sampler circuit 252 by selecting the output of PSROs 226–248 to drive the sampler circuit, or alternatively, one of the internal PSROs in MHCRO 250 may be selected to drive the sampler circuit.

Figure 3A:
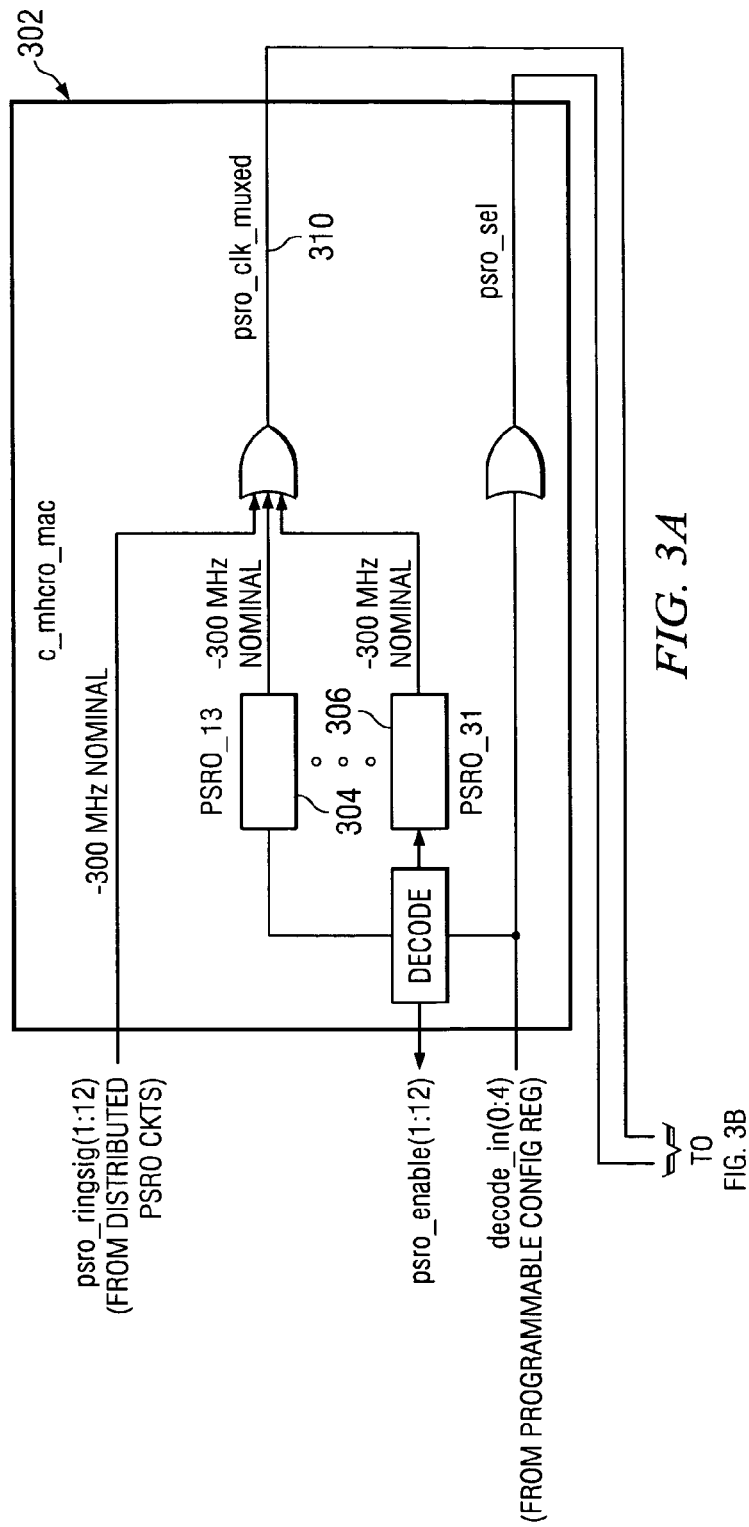
FIGS. 3A and 3B illustrates in more detail the Macro for Hardware Characterization of Ring Oscillators (MHCRO) characterization circuitry and digital sampler circuitry used to observe the characterization circuitry as described in FIG. 2 in accordance with a preferred embodiment of the present invention.
Figure 3B:
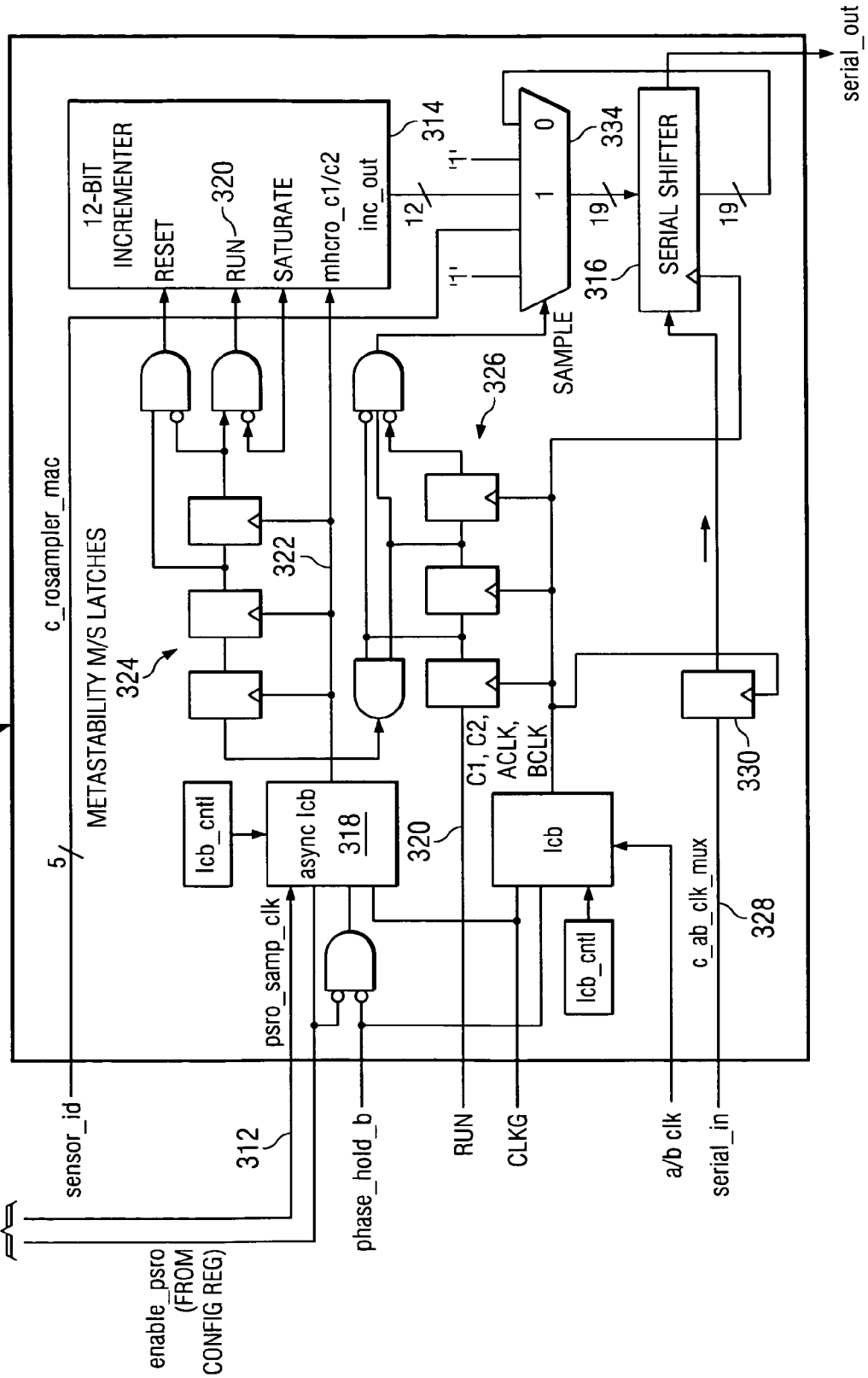

FIG. 3 illustrates in more detail the MHCRO characterization and a digital sampler circuitry described in FIG. 2 in accordance with a preferred embodiment of the present invention. In this illustrative embodiment, the combination of the MHCRO, such as MHCRO 250, and sampler circuitry, such as sampler circuitry 252 in FIG. 2, may be used to observe the characterization of a silicon chip when the chip is installed within a functional system.

As mentioned previously, the characterization circuitry, such as MHCRO 302, includes a plurality of performance screen ring oscillators (PSROs). PSROs, such as PSROs 304 and 306, may be used for measuring the physical performance of a chip (i.e., how fast the electrons flow through a circuit). PSROs 304 and 306 each comprise an odd number of cascaded inverters, with the output of each cascade fed to the input of sampler 308. PSROs determine inverter propagation delays (e.g., rate at which each inverter flips the output when the input changes) as a means to evaluate the wafer fabrication process and performance of the silicon. PSROs 304 and 306 may be enabled by an enabling signal that is sourced by a configuration register. Output (psro_clk_muxed) 310 from the PSROs in MHCRO 302 is provided to sampler 308.

Sampler 308 is a digital sampler circuit attached to the output of the MHCRO 302. Part of sampler 308 operates in the MHCRO asynchronous oscillator clock domain, and part of sampler 308 operates in the clkg domain, which is the normal synchronous chip clock used by all other major circuits on the computer chip. Sampler 308 uses functional clocks to sample the output from MHCRO 302, so that no special test clocks or procedures are needed to read the installed chip's parameters.

Sampler 308 also comprises incrementer 314 and serial shifter 316. In this illustrative example, incrementer 314 is a 12-bit incrementer or incremental counter that is used to count pulses received from MHCRO 302 for a known number of system cycles. In other words, the incrementer counts the number of PSRO oscillations in the MHCRO, the number being dependent upon how fast the transistors in the chip are performing. Output 310 from MHCRO 302 is coupled to incrementer 314 through asynchronous local clock buffer (async lcb) 318.

Run signal 320 is coupled to incrementer 314 over path 322 through a set of metastability latches 324 and to serial shifter 316 through a second set of latches 326. When a run signal sourced by clkg domain latch is initiated, the count in incrementer 314 is incremented by each successive pulse of output signal 310 provided by the oscillators in MHCRO 302. Thus, run signal 320 may define a sample acquisition time period. At the end of the run signal 320, the final count value temporarily remains in incrementer 314. The frequency of the oscillators in MHCRO 302 and thus the performance of the chip may be determined using the count value in incrementer 314 and the time duration of run signal 320. The count value is sampled into serial shifter 316, where the count value is sent out of sampler 308 to a control deserializer macro.

Incrementer 314 is clocked during normal operation by the MHCRO domain. Incrementer 314 is reset on the rising edge of the run signal. Run signal 320 is fed through three metastability latches 324 in the async clock domain derived from the PSRO output domain. During logic built-in self test (LBIST), metastability latches 324 and incrementer 314 are run on the clkg domain. When incrementer 314 reaches full-count, the incrementer saturates, but does not roll over. Saturation (0xFFF) indicates improperly configured sampling hardware (sample period too long) and so prevents the user from accidentally using bad readings. Incrementer 314 will be cleared on the next rising edge of run signal 320.

Figure 5:
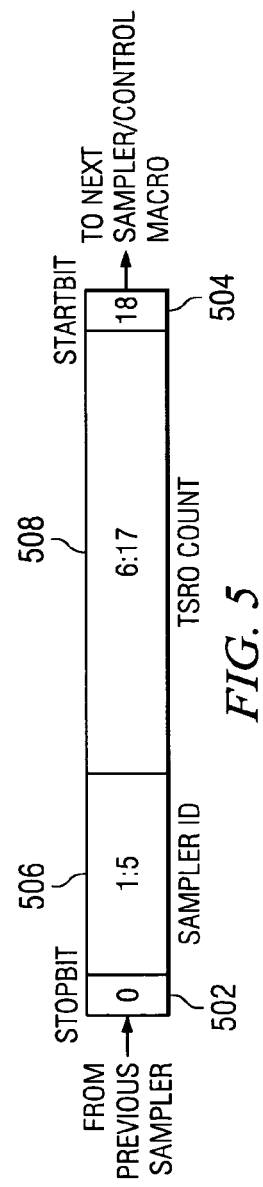
FIG. 5 is an exemplary block diagram of a serial data format followed by each sampler in accordance with a preferred embodiment of the present invention.

The data output from incrementer 314 is muxed with the data input of serial shifter 316. In this illustrative example, serial shifter 316 is a 19-bit serial shifter that resides in the clkg domain. The clkg signal is the master clock signal of the integrated circuit that is being monitored by the MHCRO. Serial shifter 316 continually shifts the data input from serial_in 328, through staging latch 330, to serial_out 332. In particular, the data input of bits 6:17 of serial shifter 316 is muxed with the data output from incrementer 314. When a sample pulse is delivered, multiplexer 334 selects the data output from incrementer 314. In addition, bits 0 and 18 are set to logic "1" to frame the data packet with start and stop bits, respectively. The format of the complete data packet loaded into serial shifter 316 is shown in FIG. 5. Bits 1:5 of serial shifter 316 are set to the particular sampler's ID pins to provide the sampler identification for the loaded count value.

The control unit in the present invention, such as control unit 255 in FIG. 2, comprises logic that sends run and sample signals to each sampler circuit. The control unit uses a reference clock (refclk) to mark time between run and sample (i.e., run pulse for a single cycle) signals. This refclk may be a time invariant source, such as that described in related U.S patent application "System and Method for Thermal Monitoring of IC Using Sampling Periods of Invariant Duration", which is incorporated above. The control logic also collects and deserializes the data from sensors on the chip and made available though a clocks-running SCOM interface to the service processor, allowing the MHCRO to be sampled during functional runtime.

Figure 4:
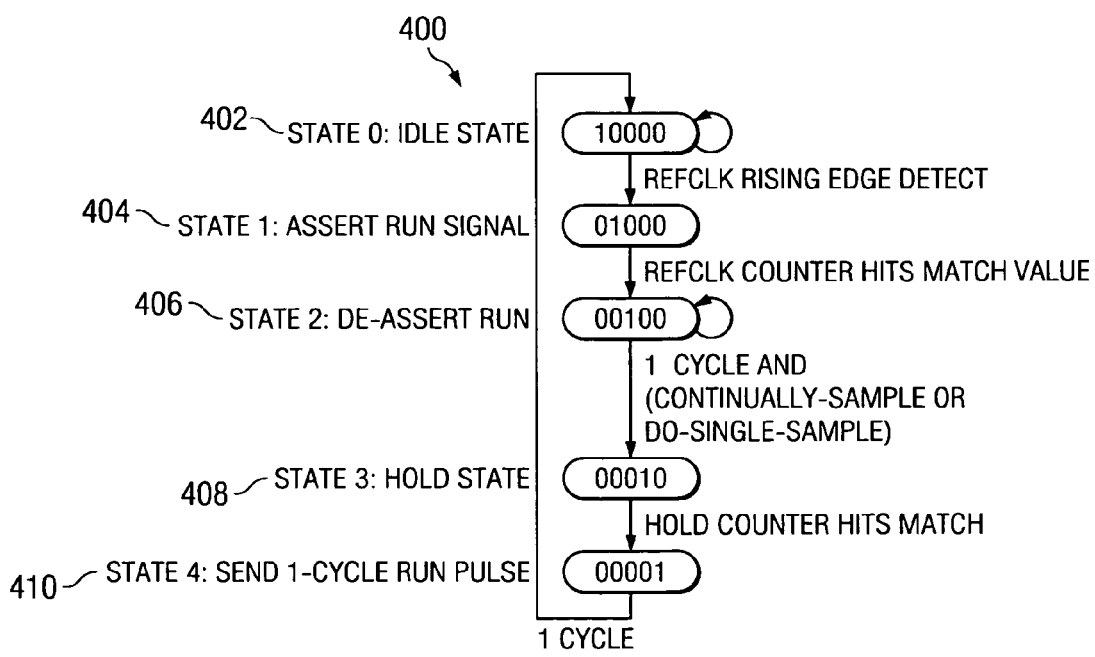
FIG. 4 is an exemplary diagram of a run state machine in accordance with a preferred embodiment of the present invention.

The primary controller of the control unit macro is a state machine, such as, for example, run state machine 400 shown in FIG. 4. FIG. 4 is an exemplary diagram of a run state machine in accordance with a preferred embodiment of the present invention. Run state machine 400 produces the run signal to sampler 308 in FIG. 3. Run state machine 400 comprises five states—an idle state, run state, single-sample wait state, hold state, and a sample state.

In state 0 or idle state 402, the run signal is held to logic '0'. The state machine moves to state 1 if the logic detects a rising edge on the refclk. As a design note, state 0 is the default state, as well as single-sample mode. Consequently, when the continuous run clocks are started, state machine 400 will go through state 1 and 2 before stopping in state 2. If the control unit macro has been placed in continuous-run mode by scan-loading the mode registers, the state machine will not stop at state 2. If the control unit macro has been placed in single-sample-run mode by scan-loading the mode registers, the state machine will hold at state 2 until the control unit receives the command to sample the MHCRO.

In state 1 or run state 404, run state machine 400 asserts the run signal to start the 12-bit refclk counter. Run state machine 400 moves to state 2 when the refclk counter reaches the value to which the counter runs before the sample is taken, or match value. This process may be used to implement the programmable duration of the sample period. The refclk counter match value may then be programmed with a reference mode register. The run time for run state 400 should be long enough for the previous sample to shift into the deserializer. For example, if there are 32 samplers with 20 bits per sampler, more than 640 cycles are required (20 bits/sampler×32 samplers+staging latches= 640+staging latches). In the preferred embodiment, the maximum desired PSRO count is 1000 (although incrementer 314 supports a maximum count of 4096) at 25 degrees Celsius. The refclk counter match value should be programmed based on the refclk source frequency to wait approximately 470 nanoseconds.

In state 2 or single-sample wait state 406, the run signal is deasserted. The state machine moves to state 3 after one cycle if either a continuous sample mode is asserted or if a single sample mode is asserted and an SCOM read is requested.

In state 3 or hold state 408, run state machine 400 holds run signal at logic '0' and starts a hold counter. The hold state is used to ensure that incrementer 314 is inactive before its data is sampled. The duration of hold state 408 may be chosen via a reference mode register. The state machine then moves to state 4 at the end of the hold duration.

State 4 or sample state 410 only lasts one cycle. The run signal is asserted for this single cycle, causing the sampler circuit to sample its data into the shift registers. After state 4, the state machine returns to state 0.

Furthermore, the control unit macro 255 also collects and deserializes data from the sampler signals. The sampler circuit has a serial input and a serial output. Conceptually, multiple samplers could be serially daisy-chained to reduce chip wiring. In this embodiment, the serial input of the sampler is tied to ground and the output of the sampler is connected to the control unit macro. In accordance with a preferred embodiment of the present invention, the serialized data from a sampler may use the framed packet format illustrated in FIG. 5. Bits 0 502 and 18 504 are stop bits and start bits respectively, bits 1:5 506 comprise the sampler ID pins, and bits 6:17 508 comprise the PSRO count as selected by the MHCRO circuitry.

In one example, when a framed packet arrives in the 19-bit wide shift register in the control unit macro, the packet is copied into a parallel-loaded register and then made available to the Service Processor using functional system clocks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for dynamic silicon characterization observability of a processor chip using functional clocks, the method comprising:
   generating signal pulses using one or more oscillators in a characterization circuit, wherein the signal pulses represent a frequency of a circuit in the processor chip;
   counting the generated signal pulses within a predetermined time period in a sampler circuit to form a count value;
   sampling the count value;
   generating count data based on the count value; and
   transferring the count data from the sampler circuit to a control unit to determine the silicon characterization.

2. The method of claim 1, further comprising:
   identifying an optimal operating frequency of the processor chip based on the silicon characterization.

3. The method of claim 1, wherein the one or more oscillators measure normal process variation across the processor chip.

4. The method of claim 1, wherein a time invariant clock is used to control the predetermined time period the characterization circuit is sampled.

5. The method of claim 1, wherein output of an oscillator in the one or more oscillators in the characterization circuit is used to drive the sampler circuit.

6. The method of claim 1, wherein the one or more oscillators test different aspects of a silicon manufacturing process.

7. The method of claim 1, wherein the generating, counting, sampling, and transferring steps are performed at runtime.

8. The method of claim 1, wherein the sampler circuit uses functional clocks.

9. The method of claim 1, wherein the count data is transferred from the sampler circuit to the control unit using functional clocks.

10. The method of claim 1, wherein the control unit continually samples the one or more oscillators.

11. The method of claim 1, wherein the control unit samples the one or more oscillators in response to code running on the processor.

12. A system for dynamically observing silicon characterization in a processor chip using functional clocks, comprising:
- a characterization circuit comprising one or more oscillators for generating signal pulses, wherein the signal pulses represent a frequency of a circuit in the processor chip;
- a sampler circuit connected to the characterization circuit, wherein the sampler circuit counts the signal pulses from the characterization circuit within a predetermined time period; and
- a control unit connected to the sampler circuit, wherein the control unit comprises logic to determine a duration of time for counting the signal pulses from the characterization circuit and to collect count data from the one or more oscillators to determine the silicon characterization.

13. The system of claim 12, wherein the sampler circuit comprises an incrementer and at least one functional clock.

14. The system of claim 13, wherein at least one functional clock is used to sample the characterization circuit.

15. The system of claim 12, wherein a time invariant clock is used to control the duration of time the characterization circuit is sampled.

16. The system of claim 12, wherein the one or more oscillators measure normal process variation across the processor chip.

17. The system of claim 12, wherein output of an oscillator in the one or more oscillators in the characterization circuit is used to drive the sampler circuit.

18. The system of claim 12, wherein the count data is transferred from the sampler circuit to the control unit using functional clocks.

19. The system of claim 12, wherein the control unit continually samples the one or more oscillators.

20. The system of claim 12, wherein the control unit samples the one or more oscillators in response to code running on the processor chip.

* * * * *